A. D. BEIL.
COTTON CHOPPER.
APPLICATION FILED MAR. 16, 1909.

925,743.

Patented June 22, 1909.
3 SHEETS—SHEET 1.

Inventor
A. D. Beil,

A. D. BEIL.
COTTON CHOPPER.
APPLICATION FILED MAR. 16, 1909.

925,743.

Patented June 22, 1909.
3 SHEETS—SHEET 3.

Witnesses
W. H. Woodson
J. M. Fallin

Inventor
A. D. Beil,

By Hra Macy, Attorneys

UNITED STATES PATENT OFFICE.

ALBIRT D. BEIL, OF SHARON, PENNSYLVANIA.

COTTON-CHOPPER.

No. 925,743.  Specification of Letters Patent.  Patented June 22, 1909.

Application filed March 16, 1909. Serial No. 483,725.

*To all whom it may concern:*

Be it known that I, ALBIRT D. BEIL, citizen of the United States, residing at Sharon, in the county of Mercer and State of Pennsylvania, have invented certain new and useful Improvements in Cotton-Choppers, of which the following is a specification.

This invention relates to cotton choppers and has for its object to provide a strong, durable and thoroughly efficient machine of this character especially designed for thinning rows of cotton plants and embodying mechanism for chopping the plants to be destroyed, so as to prevent maturing and crowding the plants to be left standing.

A further object of the invention is to provide a cotton chopper including a main frame having a chopping blade mounted for rotation thereon and provided with auxiliary cutter carrying frames, the latter being pivotally connected with and adjustable vertically of the main frame, so as to permit the same to be moved to operative and inoperative positions.

A further object is to provide means for tilting the truck to elevate the several chopping blades, and independent means for effecting the adjustment of the auxiliary blades.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
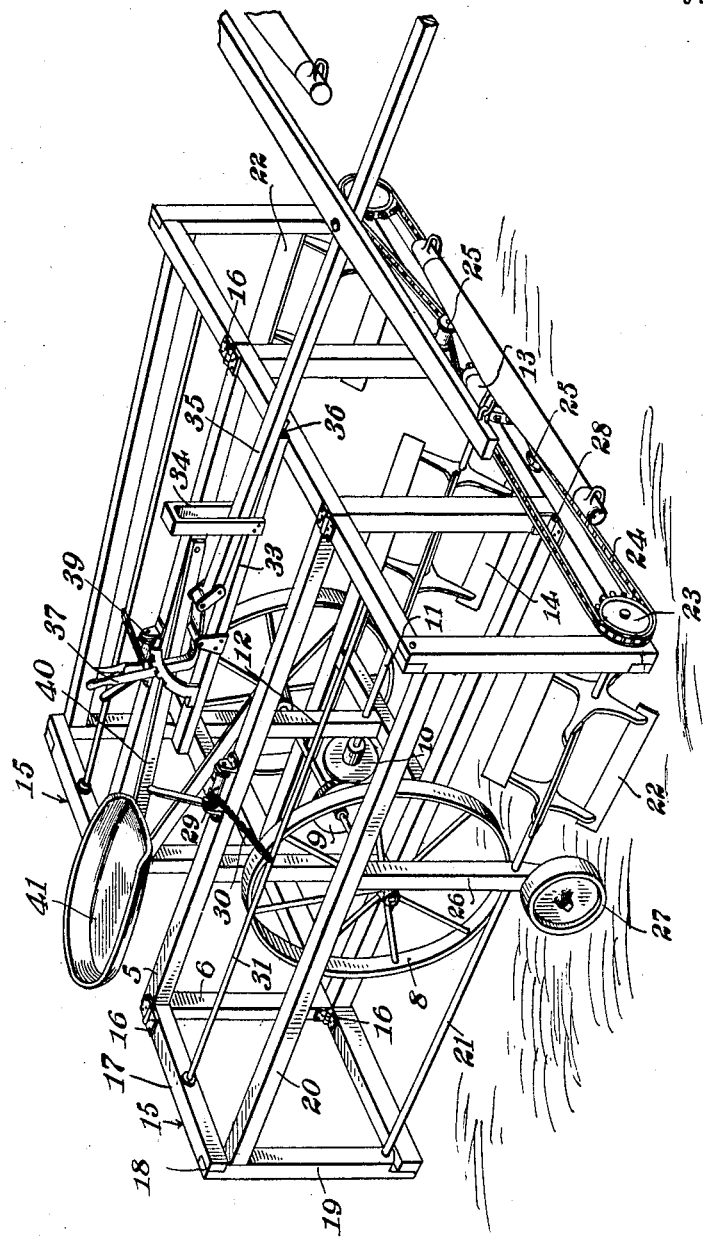
Figure 2:
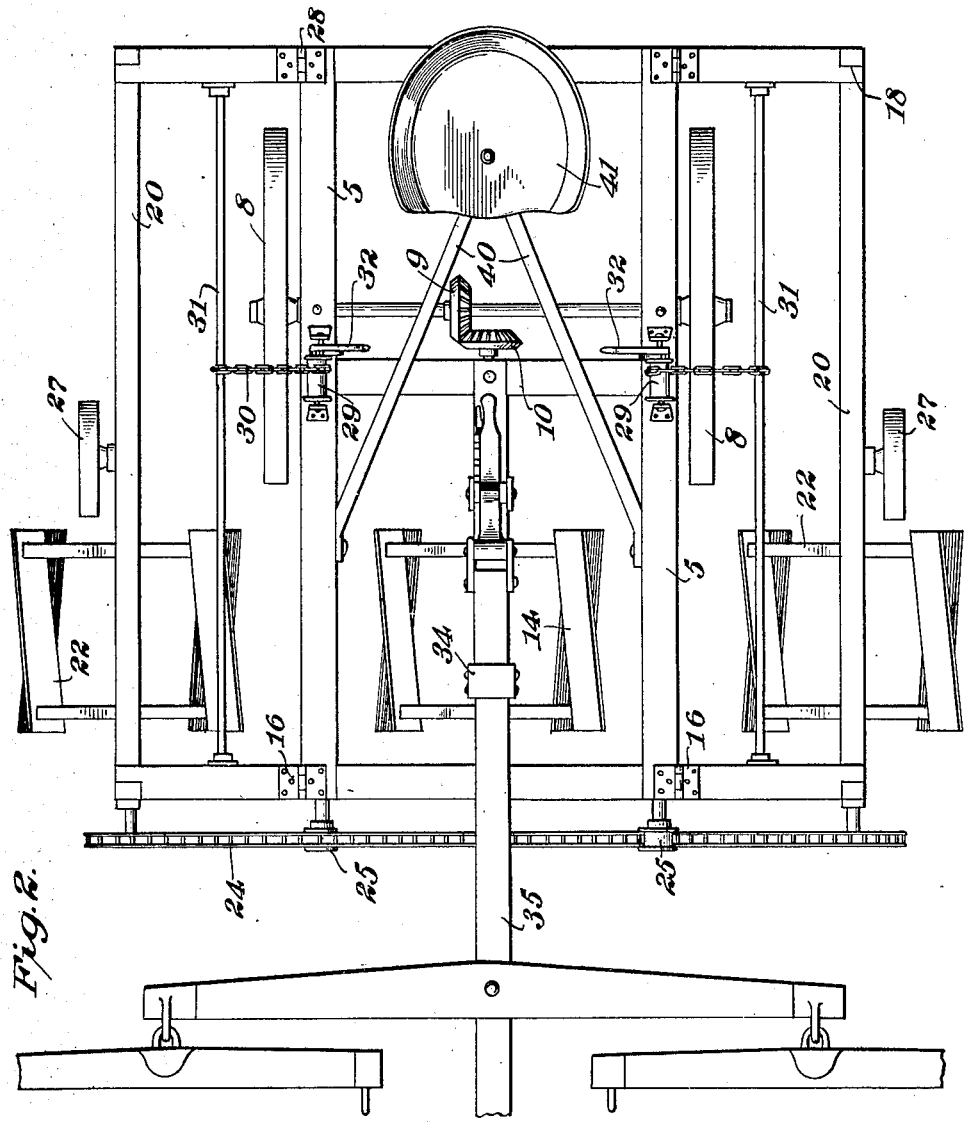
Figure 3:
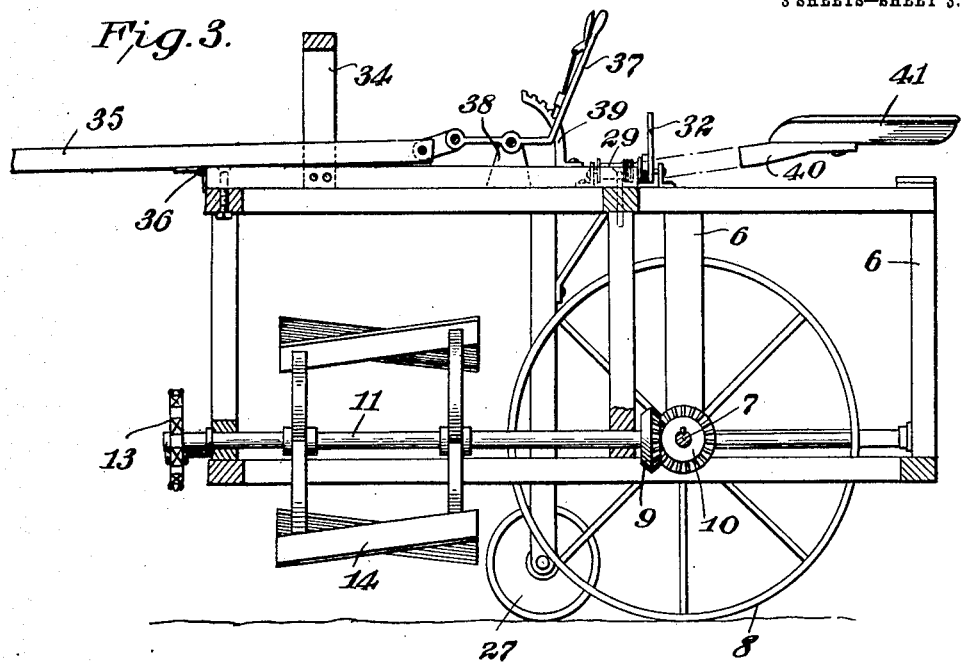
Figure 4:
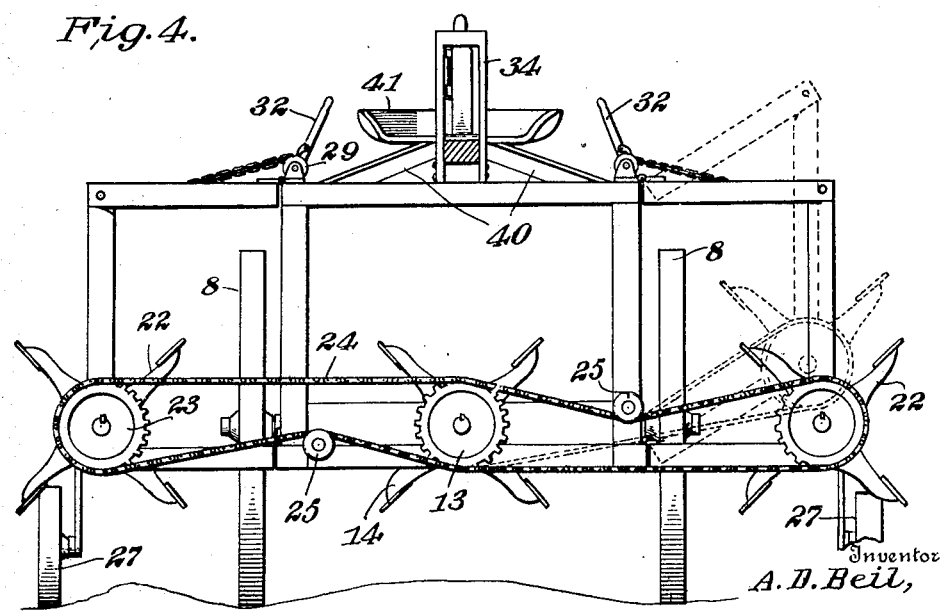

For a full understanding of the invention and the merits thereof and to acquire a knowledge of the details of construction, reference is to be had to the following description and accompanying drawings, in which:

Figure 1 is a perspective view of a cotton chopper constructed in accordance with my invention; Fig. 2 is a top plan view of the same; Fig. 3 is a vertical sectional view; and, Fig. 4 is a front elevation, one of the side frames being shown in dotted lines in elevated position.

Corresponding and like parts are referred to in the following description and indicated in all the views of the drawings by the same reference characters.

The improved cotton chopper forming the subject matter of the present invention includes a main supporting frame 5 comprising spaced longitudinal bars connected by transverse bars, the former being reinforced and strengthened by the provision of spaced uprights 6, in one set of which is journaled an axle 7 carrying the traction wheels or drivers, indicated at 8.

Keyed or otherwise rigidly secured to the axle 7 is a beveled gear 9, which meshes with a corresponding beveled gear 10 carried by a longitudinally disposed shaft 11. One end of the shaft 11 is journaled in an upright 12, while the other end thereof extends through an opening in one of the transverse connecting bars of the frame and is provided with a sprocket wheel 13. Mounted on the shaft 11 is a chopping element preferably formed of spaced members having radiating arms, the terminals of which are connected by inclined cutting blades 14, which cut and destroy some of the growing plants, as the machine is caused to travel over the surface of the field, thereby to thin out some of the plants and allow the remaining plants to fully mature.

Disposed on opposite sides of the main frame 5 are auxiliary frames 15 having their inner ends pivotally connected at 16 with the adjacent upper and lower longitudinal bars of the main frame, so as to permit said auxiliary frames to be adjusted vertically of the main frame when desired. The auxiliary frames 15 are each formed of spaced horizontally disposed bars 17 having their free ends rabbeted at 18 for pivotal connection with the corresponding rabbeted ends of vertical bars 19 connected by a longitudinally disposed bar 20, as shown. By forming the abutting ends of the horizontal and vertical bars with rabbeted terminals, the auxiliary bars may be adjusted vertically of the main frame without binding or wedging action between the parts.

Journaled in the lower ends of the vertical bars of each auxiliary frame is a longitudinally disposed shaft 21 having a rotary chopping element or cutter 22 secured thereto, and similar in construction to the cutter on the shaft 11, one end of the shaft 21 being extended longitudinally at the front of the machine and provided with a sprocket wheel 23 disposed in alinement with the sprocket wheel 13 to permit the attachment of a sprocket chain 24, there being one or more idle rollers 25 secured to the main supporting frame and disposed in staggered relation for the purpose of taking up the slack in the sprocket chain and also to permit free adjustment of the auxiliary frames.

Each auxiliary frame 15 is provided with a central stay or support 26, the free end of which is deflected laterally and provided with a stub shaft upon which is journaled a wheel or roller 27, which latter travels over the surface of the ground when the auxiliary frames are moved to operative position and serves to assist in sustaining the weight of said frame.

Attention is here called to the fact that the pivot pins 28 of the hinges 16 are removable, so that the auxiliary frames may be readily detached from the main frame when it is desired to compactly assemble the machine for transportation or shipment.

Mounted on opposite sides of the main supporting frame are suitable drums 29 to each of which is connected one end of a chain, cable or other flexible medium 30, the opposite end of which is secured to a transverse bar or shaft 31 carried by the adjacent auxiliary frame 15. Pivotally mounted on the main frame adjacent each drum 29 is an operating lever 32 having a pawl for engagement with ratchet teeth formed on the drum 29, so that by operating the lever 32, the chain 30 may be wound upon the drum to effect the adjustment of the auxiliary frame.

Secured to the upper portion of the main frame 5 is a longitudinal bar 33 having a keeper 34 secured thereto and adapted to receive the free end of a draft tongue 35, the latter being pivotally connected at 36 with the forward end of the bar 33, as shown, so that the truck may be readily tilted on the traction wheels 8, thereby simultaneously raising or lowering the cutting blades of the main and auxiliary frames. As a means for effecting the simultaneous adjustment of the main and auxiliary frames, there is provided a lever 37 having its intermediate portion pivotally mounted on a suitable bracket or support 38 and its short end operatively connected with the inner end of the draft tongue, so that by operating said lever the truck may be readily tilted on the traction wheels, while the draft tongue remains in a relatively horizontal plane. The free end of the operating lever 37 is adapted to engage the teeth of a segmental rack 39 mounted on the main supporting frame for the purpose of locking the main and auxiliary frames in lowered or elevated position. Thus it will be seen that by manipulating the lever 37 all of the cutting or chopping blades may be elevated simultaneously, while by operating the lever 32 the auxiliary frames may be elevated to effect the adjustment of the auxiliary chopping blades independently of the chopping blade on the main supporting frame.

Secured to the upper longitudinal beams of the main supporting frame are converged bars 40 to the meeting ends of which is secured in any suitable manner a seat 41 for the driver, so that the latter may readily direct the movements of the team, when traveling back and forth between the different rows of growing plants.

In operation the machine is caused to travel over surfaces of a field between the rows of growing plants and parallel therewith. When either one or both of the auxiliary frames are moved to lowered position, the chopping blades carried by said frames will engage and sever the cotton plants at predetermined intervals, thus thinning out some of the plants and allowing the plants left standing to fully mature.

By having an auxiliary chopping blade or cutter mounted on each side of the main frame, the machine may be utilized for cutting or thinning the growing plants in adjacent rows. After the cotton has been cut the lever 37 is depressed, thus elevating all of the cutting or chopping blades, so that the machine may be moved from one portion of the field to another without liability of the said cutting blades coming in contact with the ground and dulling or otherwise injuring the same.

It will of course be understood that the machine may be made in different sizes and provided with either one or more auxiliary frames without departing from the spirit of the invention.

Having thus described the invention what is claimed as new is:

1. A cotton chopper including a main frame, an auxiliary frame pivotally connected therewith and adjustable vertically of the main frame, chopping blades carried by the main and auxiliary frames, and means for transmitting motion from one set of blades to the other.

2. A cotton chopper including a main frame provided with traction wheels, auxiliary frames pivotally connected therewith and adjustable vertically of the main frame, chopping blades carried by the main and auxiliary frames, means for transmitting motion from one set of blades to the other, and means for tilting the main frame, thereby to simultaneously elevate all of said cutting blades.

3. A cotton chopper including a main frame provided with traction wheels, auxiliary frames pivotally connected therewith and adjustable vertically of the main frame, longitudinal shafts journaled in the main and auxiliary frames and each provided with a sprocket wheel, chopping blades carried by said shafts, a sprocket chain connecting the sprocket wheels for transmitting motion from one set of chopping blades to the other, and means operatively connected with the traction wheels for rotating the longitudinal shaft of the main supporting frame.

4. A cotton chopper including a main frame provided with traction wheels, auxiliary frames pivotally mounted for vertical movement on the main frame, chopping blades carried by the main and auxiliary frames, means for rotating the chopping blade of the main frame, means for transmitting motion from the chopping blade of the main frame to the chopping blades of the auxiliary frames, and means for tilting the main frame on the traction wheels, thereby effecting the simultaneous elevation of all of the chopping blades.

5. A cotton chopper including a main frame provided with traction wheels, auxiliary frames pivotally mounted for tilting movement on the main frame, chopping blades carried by the main and auxiliary frames, means for transmitting motion from the traction wheels to the chopping blade of the main frame, means for transmitting motion from the chopping blade of the main frame to the chopping blades of the auxiliary frames, means for raising and lowering the auxiliary frames, and means for locking the auxiliary frames in adjusted position.

6. A cotton chopper including a main frame provided with traction wheels, auxiliary frames pivotally mounted for tilting movement on the main frame, chopping blades carried by the main and auxiliary frames, means operatively connected with the traction wheels for simultaneously rotating the chopping blades of all of said frames, means for simultaneously elevating the chopping blades of the main and auxiliary frames, and means operatively connected with the auxiliary frames for adjusting the chopping blades of said frames independently of the chopping blade of the main frame.

7. A cotton chopper including a main frame provided with traction wheels, a shaft operatively connected and driven by the traction wheels, a rotary chopping blade carried by the shaft, auxiliary frames pivotally mounted for tilting movement on the main frame and provided with similar chopping blades, means for transmitting motion from the chopping blade of the main frame to the chopping blades of the auxiliary frames, drums secured to the main frame, flexible elements connecting the drums with the auxiliary frames, and means for rotating the drums to effect the vertical adjustment of the auxiliary frames.

8. A cotton chopper including a main frame, an axle journaled on the main frame and provided with traction wheels, a beveled gear carried by the axle, a longitudinally disposed shaft journaled in the main frame and provided with a beveled gear meshing with the beveled gear on the axle, a rotary cutter secured to the shaft, one end of said shaft being extended beyond the forward end of the machine and provided with a sprocket wheel, auxiliary frames pivotally mounted for tilting movement on the main frame, shafts journaled in the auxiliary frames and provided with terminal sprocket wheels disposed in alinement with the sprocket wheel of the main frame shaft, a sprocket chain connecting the several sprocket wheels, cutters mounted for rotation with the shafts of the auxiliary frames, traction wheels depending from the auxiliary frames, means for simultaneously raising and lowering the chopping blades of all the frames, and means operatively connected with the auxiliary frames for effecting the vertical adjustment of said auxiliary frames independently of the main frame.

9. A cotton chopper including a main frame, an auxiliary frame pivotally connected therewith and adjustable vertically of the main frame, chopping blades carried by the main and auxiliary frames, and means for operating the several sets of blades.

10. A cotton chopper including a main frame provided with traction wheels, auxiliary frames pivotally mounted for tilting movement on the main frame and comprising pivotally connected bars having their adjacent ends rabbeted, standards carried by each auxiliary frame and provided with a traction roller, longitudinal shafts carried by the main and auxiliary frames and each provided with a terminal sprocket wheel, the shaft of the main frame being operatively connected and driven from the traction wheels, rotary chopping blades carried by said shafts, a sprocket chain engaging the sprocket wheels for transmitting motion from one shaft to the other, means for simultaneously raising and lowering all of said frames, and means operatively connected with the auxiliary frames for effecting the vertical adjustment of said auxiliary frames independently of the main frame.

In testimony whereof I affix my signature in presence of two witnesses.

ALBIRT D. BEIL. [L. S.]

Witnesses:
 W. N. WOODSON,
 SAMUEL N. ACKER.